United States Patent
Desai et al.

(10) Patent No.: US 7,251,583 B2
(45) Date of Patent: Jul. 31, 2007

(54) MINIMIZING USE OF PARTS THAT WILL REACH THEIR END OF LIFE PRIOR TO THE PRODUCTS FOR WHICH THOSE PARTS ARE USABLE

(75) Inventors: Sudhir M. Desai, Wappingers Falls, NY (US); James A. O'Connor, Ulster Park, NY (US); Theodore V. Purvin, Jr., Kingston, NY (US); Dean A. St. Pier, Wappingers Falls, NY (US); Anne-Marie L. Sweetland, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 10/930,390

(22) Filed: Aug. 31, 2004

(65) Prior Publication Data

US 2006/0047479 A1  Mar. 2, 2006

(51) Int. Cl.
*G06F 15/00* (2006.01)
*G06F 17/50* (2006.01)

(52) U.S. Cl. ......................... 702/183; 705/29
(58) Field of Classification Search ................ 702/183, 702/34; 705/8, 10, 22, 28, 29; 700/108, 700/109, 110
See application file for complete search history.

(56) References Cited

U.S. PATENT DOCUMENTS

| | | | |
|---|---|---|---|
| 5,216,612 A | 6/1993 | Cornett et al. ................ 700/96 |
| 5,630,070 A | 5/1997 | Dietrich et al. ................ 705/8 |
| 6,006,192 A * | 12/1999 | Cheng et al. ................... 705/7 |
| 6,128,626 A * | 10/2000 | Beauchesne ............. 707/104.1 |
| 6,594,535 B1 * | 7/2003 | Costanza ...................... 700/97 |
| 6,654,709 B2 * | 11/2003 | Aoshika et al. ............. 702/188 |
| 6,922,640 B2 * | 7/2005 | Vezzu et al. .................. 702/34 |
| 2002/0138316 A1 | 9/2002 | Katz et al. ...................... 705/7 |
| 2002/0143655 A1 * | 10/2002 | Santos et al. ................. 705/28 |
| 2002/0143665 A1 * | 10/2002 | Santos et al. ................. 705/28 |

(Continued)

OTHER PUBLICATIONS

Seo et al., Approximate Estimation of the Product Life Cycle Cost Using Artificial Neural Networks in Conceptual Design, 2002, Int. J. Adv. Manuf. Technol. 19, pp. 461-471.*

(Continued)

*Primary Examiner*—John Barlow
*Assistant Examiner*—Toan M. Le
(74) *Attorney, Agent, or Firm*—Lily Neff, Esq.; Blanche E. Schiller, Esq.; Heslin Rothenberg Farley & Mesiti, P.C.

(57) ABSTRACT

Use of parts in products is managed to minimize the use of parts that will reach their end of life prior to the products for which those parts are usable. To manage use of a part, end of life data for the part is estimated and compared to the actual or projected end of life data of a product for which the part is to be used or is used. If the comparison indicates that the part will reach its end of life prior to the product, then various factors are considered to determine whether the part is to be used in the product. The factors include cost, scheduling, alternate part availability, redesign options and/or other factors.

19 Claims, 8 Drawing Sheets

U.S. PATENT DOCUMENTS

| | | | |
|---|---|---|---|
| 2002/0165805 A1* | 11/2002 | Varga et al. | 705/28 |
| 2003/0004597 A1 | 1/2003 | Zulpa et al. | 700/106 |
| 2003/0014287 A1 | 1/2003 | Williams et al. | 705/7 |
| 2003/0023519 A1 | 1/2003 | Zulpa et al. | 705/29 |
| 2003/0028437 A1 | 2/2003 | Grant et al. | 705/26 |
| 2003/0033191 A1* | 2/2003 | Davies et al. | 705/10 |
| 2003/0069739 A1 | 4/2003 | Wylie | 705/1 |
| 2003/0115090 A1 | 6/2003 | Mujtaba et al. | 705/8 |
| 2003/0144897 A1 | 7/2003 | Burruss et al. | 705/10 |
| 2003/0149578 A1 | 8/2003 | Wong | 705/1 |
| 2004/0103048 A1* | 5/2004 | Vitulli et al. | 705/28 |

OTHER PUBLICATIONS

Rose et al., Determining End-of-Life Stategies As A Part of Product Definition, 1999 IEEE, pp. 219-224.*

* cited by examiner

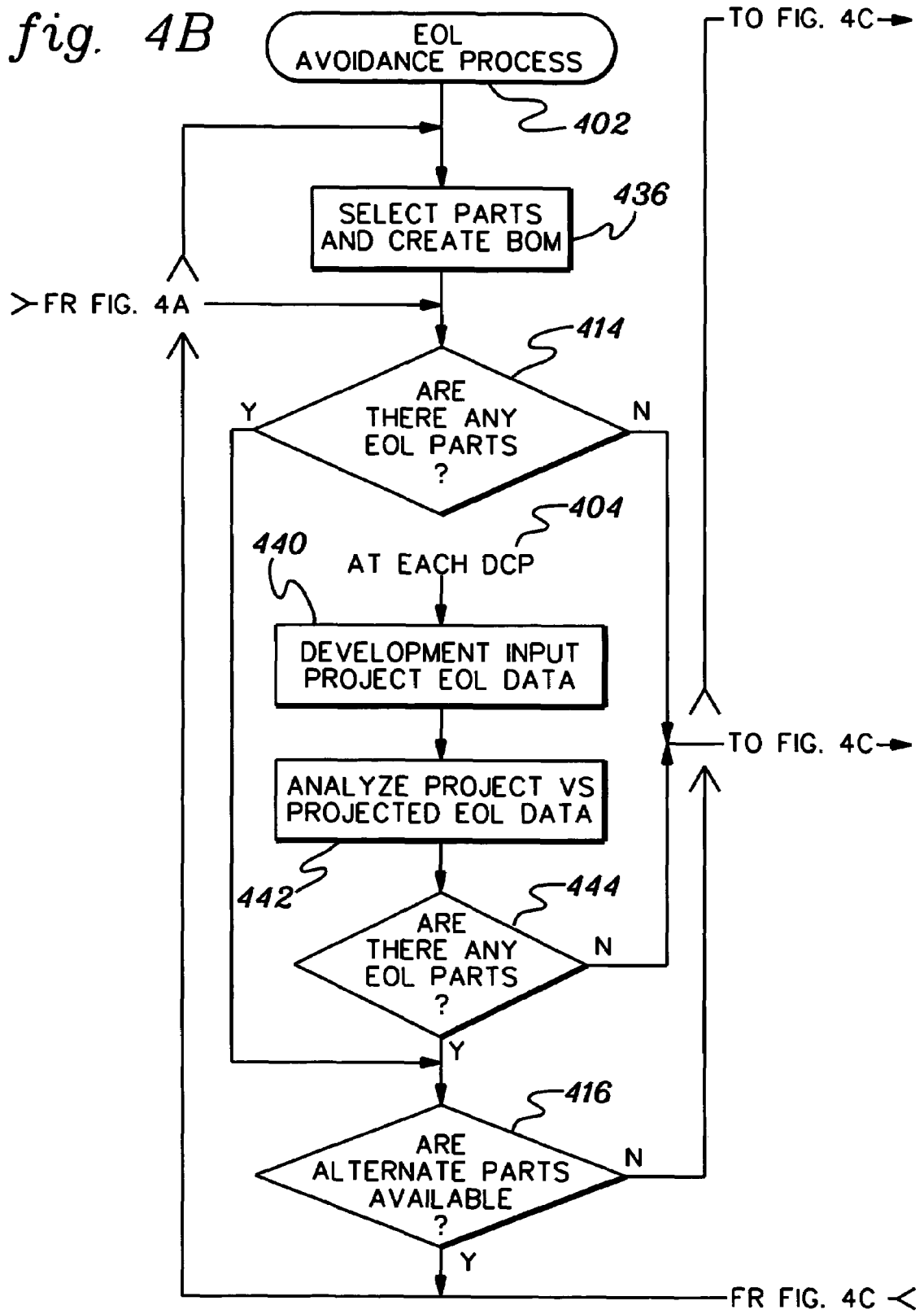

| PART TYPE 500 | WHITE/GRAY/BLACK BOX 502 | PART NUMBER 504 | PRODUCT/PART WITHDRAWAL DATE 506 | ACTUAL/ESTIMATED EOL DATE 508 |
|---|---|---|---|---|
| SERVER 510 | WHITE | N/A | PROJECTED WITHDRAWAL 4Q2007 | N/A |
| PROCESSOR 1 GHz 512 | WHITE | 1234534 | 4Q2007 | 4Q2010 |
| PROCESSOR 1.2 GHz 514 | WHITE | 5483152 | 4Q2007 | 4Q2010 |
| PROCESSOR 516 | WHITE | 6578940 | 4Q2007 | 4Q2015 |
| 2GB MEMORY CARD 518 | WHITE | 94875594 | 4Q2008 | 3Q2009 |
| ETHERNET CARD 520 | BLACK | 3454356 | 4Q2008 | 2Q2004 |
| CAPICATOR 1.5 μF 522 | N/A | 1274360 | 4Q2008 USED ON MEMORY CARD | 3Q2005 |
| ASIC MODULE 524 | N/A | 3762652 | 4Q2008 USED ON PROCESSOR CARD | 3Q2005 |
| HIGH SPEED CONNECTOR 526 | N/A | 4598763 | 4Q2007 | 2Q2002 |
| 3.2V REGULATOR 528 | N/A | 6857409 | 4Q2007 USED ON PROCESSOR CARD | 3Q2003 | fig. 5

MINIMIZING USE OF PARTS THAT WILL REACH THEIR END OF LIFE PRIOR TO THE PRODUCTS FOR WHICH THOSE PARTS ARE USABLE

TECHNICAL FIELD

This invention relates, in general, to managing use of parts in products, and in particular, to minimizing use of parts that will reach their end of life prior to the one or more products for which those parts are usable.

BACKGROUND OF THE INVENTION

Technology transitions are occurring at an increasingly rapid rate, and thus, parts used in the design of products are also being replaced at an increasing rate. Previously, when a supplier decided to discontinue a particular part or line of parts, the supplier was willing to maintain for its customers or users of the parts some inventory for a relatively long period of time for use as spares, replacements, etc. However, over time, suppliers have been less willing to provide this service. The suppliers no longer want the responsibility of having inventory on their books and having to scrap the unused inventory.

Since suppliers do not want the responsibility for maintaining the inventory, a process has evolved in which a supplier announces that it is discontinuing a particular part, thus, allowing the users of that part to place a last time buy order for a desired quantity of the part. To place the order, the user has to estimate the number of parts to be requested in the order. Typically, the user estimates high, so that the user is able to fill future orders for the products using that part. Now, it is the user that has to maintain the inventory and bear the costs associated therewith, including the scrapping of any unused parts.

The expense of last time buys and maintenance of parts inventory is considerable. Thus, a need exists to minimize those costs. In particular, a need exists for a capability that minimizes the use of parts at risk of reaching their end of life prior to the products for which the parts are usable.

SUMMARY OF THE INVENTION

The shortcomings of the prior art are overcome and additional advantages are provided through the provision of a method of managing use of parts in products. The method includes, for instance, obtaining estimated end of life data for a part usable in at least one product, the estimated end of life data being non-part supplier provided, and using the estimated end of life data to manage use of the part in a product.

In another aspect of the present invention, a memory for storing data for access by code being executed in a communications environment is provided. The memory includes, for instance, a database used by the code to facilitate management of use of a part in a product, the database including estimated end of life data for the part, the estimated end of life data being non-part supplier provided.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 4a-4c depict further details of one embodiment of the logic associated with managing use of parts in products, in accordance with an aspect of the present invention;

FIG. 5 depicts one example of a spreadsheet that includes information for a product, as well as various parts of the product, used in accordance with an aspect of the present invention.

BEST MODE FOR CARRYING OUT THE INVENTION

In accordance with an aspect of the present invention, a capability is provided that minimizes the use of parts at a high risk of reaching their end of life prior to the products for which those parts are used or may be used (i.e., usable). A capability is provided that may be utilized at different stages of a product's life cycle to determine how to manage use of a part in the product, when the part is expected to reach its end of life prior to the end of life of the product. For instance, the capability may be used at conception, plan and launch stages of a product's life cycle, as well as during its useful life. The capability may be used at any stage of a product's life cycle to manage use of a part in the product. The capability facilitates, in one or more aspects of the invention, the identification of high risk parts (i.e., those parts at risk of going end of life) and the avoidance of those parts, resulting in the minimization of last time buys and/or redesigns.

Figure 1:
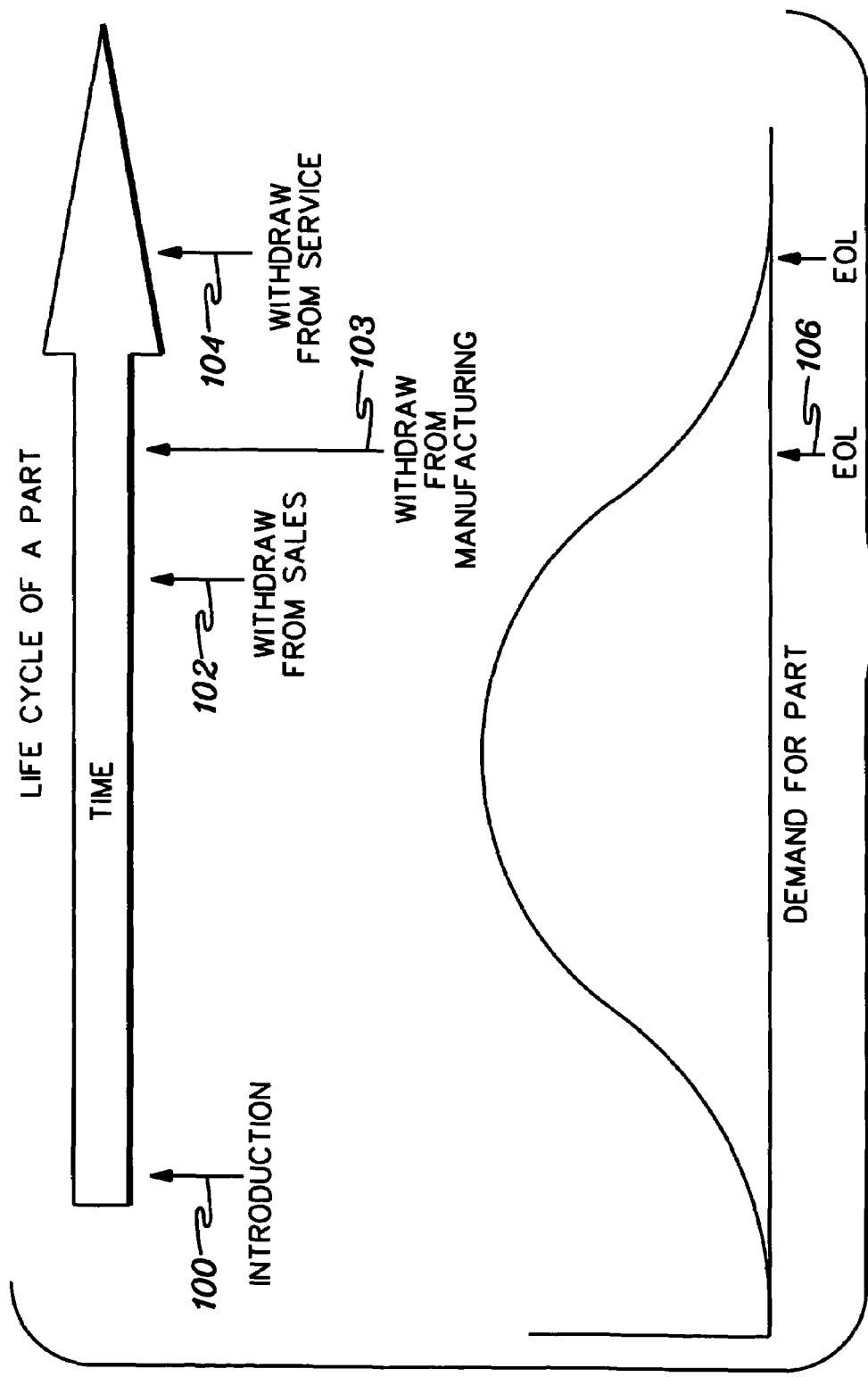
FIG. 1 depicts one embodiment of a life cycle of a part, as described with reference to one or more aspects of the present invention.

A part has a particular life cycle, as described with reference to FIG. 1. For instance, a part is introduced at a time 100, withdrawn from sales at another time 102, withdrawn from manufacturing at a time 103, and withdrawn from service at yet another time 104. At the time the part is withdrawn from manufacturing and/or from service, it has reached its end of life (EOL) 106. A part that is withdrawn from service is no longer available. When a part reaches its end of life during the useful life of a product, users of that part are forced to place a last time buy order for the part or redesign the product to eliminate the part.

A last time buy requires the users of those parts to estimate how many parts they need to have on hand to sufficiently continue to build or offer the product for some time into the future (e.g., until the end of life of the product). This estimation process is not an exact science. It is highly dependent on volume forecasts, business conditions and other factors. This forces the part's users to estimate high. If the number of parts purchased is too low, the user will be in the untenable situation of not being able to fulfill orders for customers. The result of estimating high, however, often causes about 60% of the last time buy parts to be scrapped. In addition, these last time buy parts show up in the part users' inventory, and thus, have a direct negative impact on return on assets metrics, as well as tightening of cash that could be used for other purposes. The annual inventory carrying charges can typically range from 10%-16% of the value of the parts. This can be a considerable added expense.

On the other hand, if the user fails to buy enough of the part or decides not to place a last time buy order, then an unplanned redesign of the product or products using that part is undertaken. This redesign includes finding a replacement part and making any changes to the product necessary to accommodate the replacement part, as an example.

Both last time buys and unplanned redesigns can be expensive and are typically viewed as something that could have been avoided. One way to minimize last time buys and unplanned redesigns is by eliminating high risk parts early in the product's life cycle, including early in the design stage. Therefore, in accordance with an aspect of the present invention, a capability is provided to quickly assess the likelihood that a part that is planned to be used in a particular product (or is being used in a product) will reach its end of life during the life cycle of the product. This capability enables design teams, development functional area managers, as well as others, to have clear visibility to parts having the greatest risk of reaching their end of life during the life cycle of one or more products for which the parts are usable.

As an example, this capability includes processes, mechanisms, tools and/or procedures by which a designer can have a clearer understanding and visibility early in the design cycle to the likely end of life date of parts being considered for use or reuse in a new product design. These projected end of life dates can then be compared to the projected end of life or product withdrawal dates for the one or more products in which the parts are to be used. This enables a decision to be made as to whether it would be prudent and a more optimum business decision to use an alternative part. The same is true for those managing products that are already available.

Key data and summary reports are provided early in the design cycle to help avoid the use of parts that have the highest risk of resulting in expensive last time buy purchases and to provide the realization of the associated benefits. Likewise, key data and summary reports are provided during other stages of the life cycle of a product to manage use of the parts in the product. Riskier parts are made visible to the engineering team and/or other teams, so that detailed design considerations can be made early.

As examples, these reports include end of life reports, such as the one depicted in FIG. 5 and described below; and output resulting from, for example, business case analyses. Many other reports and variations to the reports described herein may be provided without departing from the spirit of the present invention.

One embodiment of the logic associated with minimizing use of parts at a risk of reaching their end of life during the life cycle of products for which the parts are usable (referred to herein as end of life parts) is described with reference to FIG. 2. In accordance with one or more aspects of the present invention, the logic described herein can be processed one or more times during the life cycle of a product. The life cycle of a product is any stage of the product, including, but not limited to, a concept stage, plan stage, design stage, development stage, test stage, launch stage, use stage, as well as other and/or different stages. Although this logic can be processed at any stage, additional benefits are realized by executing the logic early (and relatively often) in the development process. The earlier in the development process that a part problem is detected, the more options are available and/or the less costly the fix.

Figure 2:
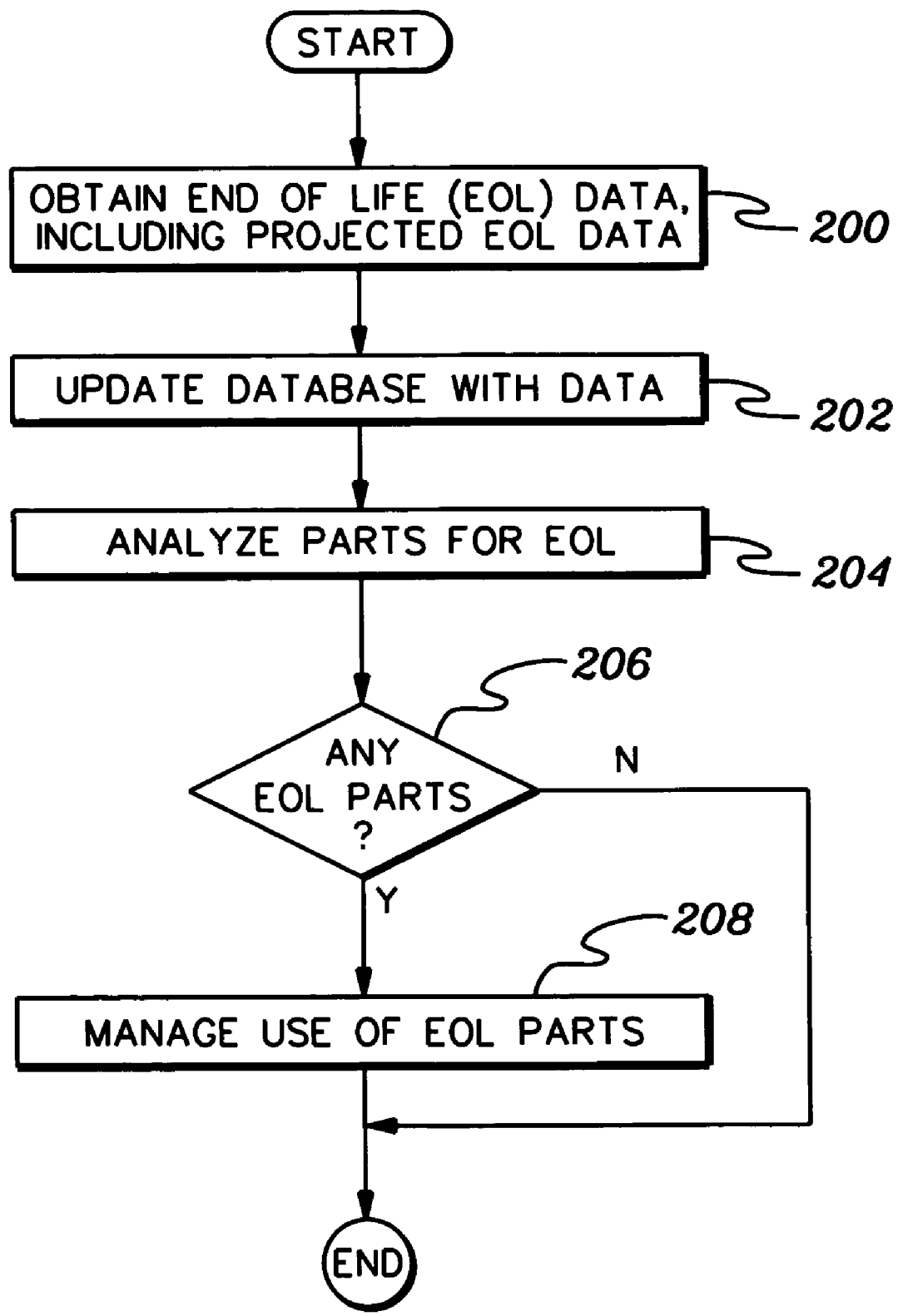
FIG. 2 depicts one embodiment of the logic associated with managing use of parts in products, in accordance with an aspect of the present invention.

Referring to FIG. 2, end of life data is obtained for one or more parts usable (i.e., used or may be used) in a chosen product, STEP 200. This end of life data includes, for zero or more parts, information provided by suppliers of those parts, such as announced end of life dates for the parts. Further, in accordance with an aspect of the present invention, the end of life data includes projected or estimated end of life data for one or more parts not having supplier provided dates. This estimated end of life data is not provided by the suppliers, but instead, is determined by users of the parts or others with an understanding of the parts.

The estimated end of life data for a part includes, for instance, an estimated end of life date for the part that is typically further out in time than a date that would be provided by the supplier. It is estimated by, for instance, development and procurement specialists (and/or others) that are knowledgeable in the specific technology evolution and/or in the individual suppliers. To estimate an end of life date for a part, various factors are considered including, for instance, a technology transition roadmap, past history, a supplier's business health, viability of like parts and/or overall economic conditions. Other and/or different factors, knowledge or information may also be considered.

This estimated date is not based on an exact science, but instead, based on knowledge of those who may know. Those who are more knowledgeable in the specific technology or supplier typically have good insight to early indications of end of life notices that are a surprise to others. The projection may not be completely accurate or exact, but will seek to better utilize and communicate information that is already available to a limited set of people. The intent is to avoid using parts and technologies with the greatest risk of going end of life during the life cycle of the product.

In one embodiment, subsequent to obtaining the end of life data, the data is stored in a database, STEP 202. As one example, an eXplore database, which is a database in Oracle offered by i2 Technologies, Dallas, Tex., is used. The database includes, for instance, an indication of various parts and information regarding those parts, including the end of life data. Other information may also be included, such as part cost information, projected or actual sales volume and/or other information.

Populating the database with the end of life data enables the data to be selected and analyzed at one or more times during a product's life cycle, STEP 204. For example, during the design stage, the designer can examine the information at the time a part is being selected for usage. As a further example, development team leads and project managers can pull complete parts reports for the product under development and analyze such reports.

The analysis is performed to determine if there are any end of life parts. A part is considered an end of life part when the part has reached its end of life, when a supplier provides an end of life date for the part that precedes the product's end of life date or when the part has a projected end of life date that precedes the product's end of life date.

Should it be determined that there are one or more end of life parts, INQUIRY 206, then use of those end of life parts in one or more products is managed, STEP 208. This management includes, for instance, making decisions as to the use of a part in a particular product. The decisions are based on a number of considerations including, for instance, the stage of the product's life cycle, whether a suitable alternate part is available, costs, business considerations, etc. The result of this analysis may indicate that an alternate part may be readily used, a redesign of the product is desirous or necessary, or that a last time buy of the part is to be placed at some point in time, as examples.

Although it is desirous to avoid last time buys, there are situations in which a last time buy is the best course of action to be taken. For instance, it may be more cost effective to plan on a last time buy and budget for that last time buy, rather than redesign the product.

In one embodiment, a spreadsheet is used to facilitate determining the appropriate course of action. This spreadsheet includes various information usable in making decisions, such as identification of one or more parts of one or more products, product/part end of life or withdrawal dates, actual/estimated end of life dates for the parts, etc. It may also include the various options and business considerations associated with each option, such that an informed decision may be made.

Figure 3:
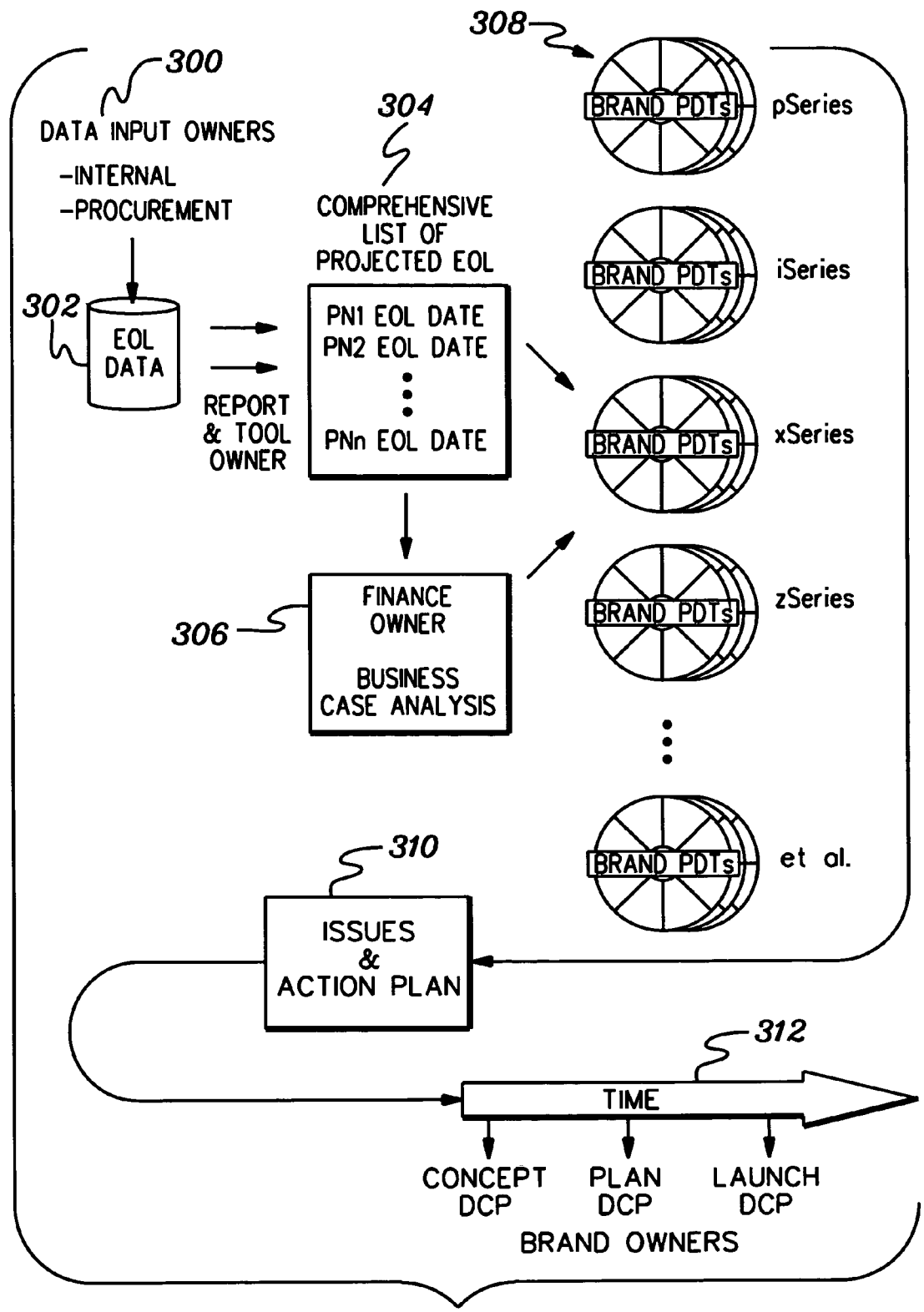
FIG. 3 is one example of a pictorial representation of one embodiment of the part management capability of an aspect of the present invention.

A pictorial overview of one example of the end of life management process of one aspect of the present invention is described with reference to FIG. 3. As shown, end of life data is input by various owners 300 into one or more databases 302. The various owners include, for example, internal suppliers, such as parts suppliers within the company manufacturing the product, as well as procurement, which is responsible for externally purchased parts. Other and/or additional owners may also be included. The end of life data includes the supplier provided end of life data, as well as the projected or estimated non-supplier provided end of life data.

Using the database, a comprehensive list of end of life data 304 is created. This comprehensive list includes, for instance, a list of parts for one or more products and for each part (or a subset thereof) an end of life date. The end of life date is either a supplier provided date or an estimated date.

The comprehensive list is made available to one or more financial owners 306, as well as to owners of one or more products 308. In the example shown in FIG. 3, the brand owners include, for instance, product development teams (PDTs) for particular product lines offered by International Business Machines Corporation. By way of example, these product lines include pSeries servers, iSeries servers, xSeries servers, and zSeries servers. However, many other product development teams may benefit from one or more aspects of the present invention.

The finance owners analyze the end of life data for parts of a particular product owned by a brand owner, as an example, and provide a business case analysis. In one example, this business case analysis includes an analysis of last time buys.

The product owners use the end of life data, as well as the business case analysis, to determine and examine the various issues, as well as provide an action plan 310.

In accordance with an aspect of the present invention, this information may be re-obtained and re-analyzed at different stages of a product's life cycle 312, including, for instance, at a concept decision checkpoint (DCP), a plan decision checkpoint and/or a launch decision checkpoint, as well as at other or different stages of a product's life cycle.

Moreover, the performance of the process may be monitored to determine if there are any unexpected misses or anomalies, and/or whether information should be obtained from different people, etc. If the monitoring indicates a problem or that a change is to be made, then the process may be updated or revised.

Figure 4A:
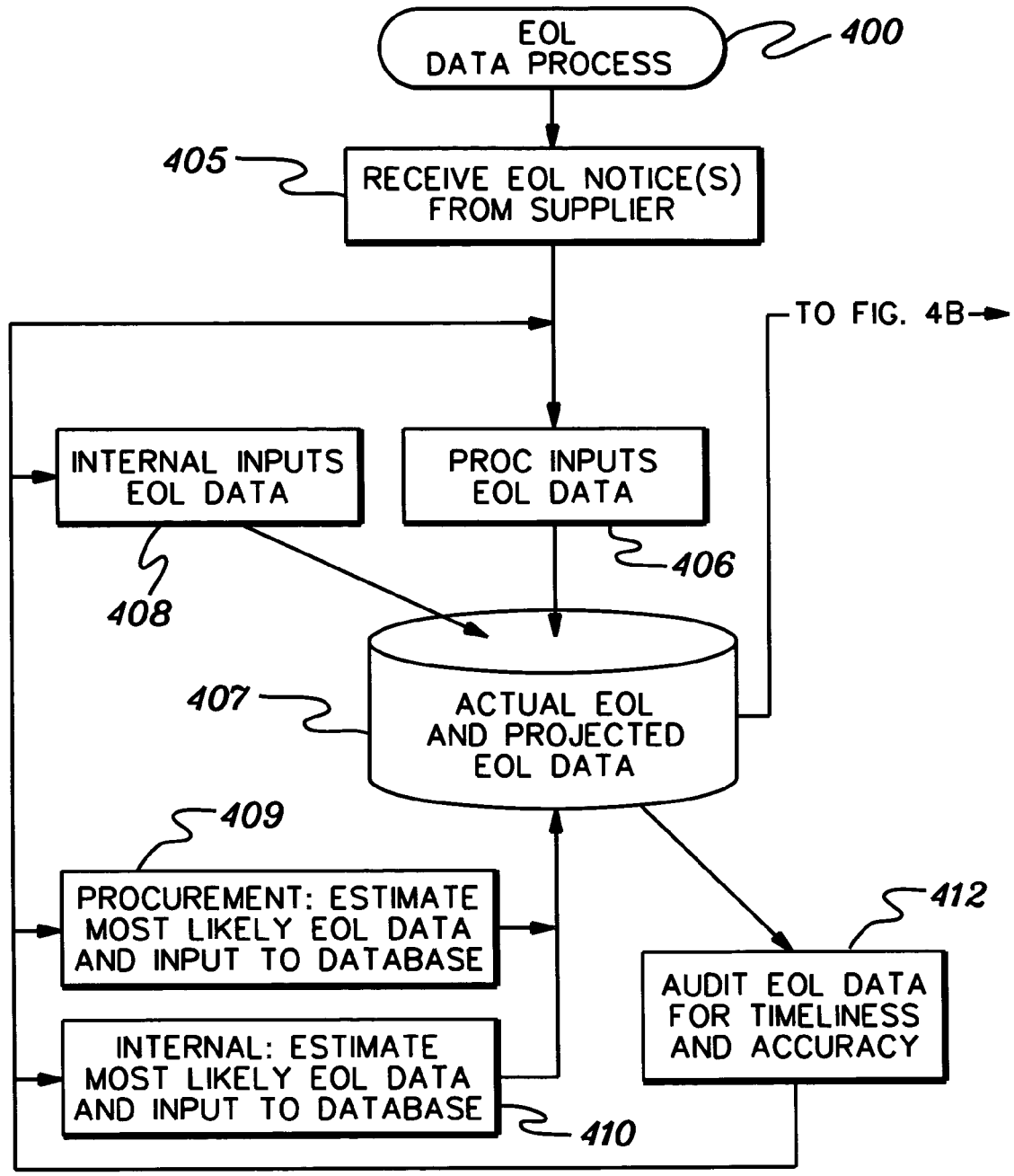
Figure 4C:
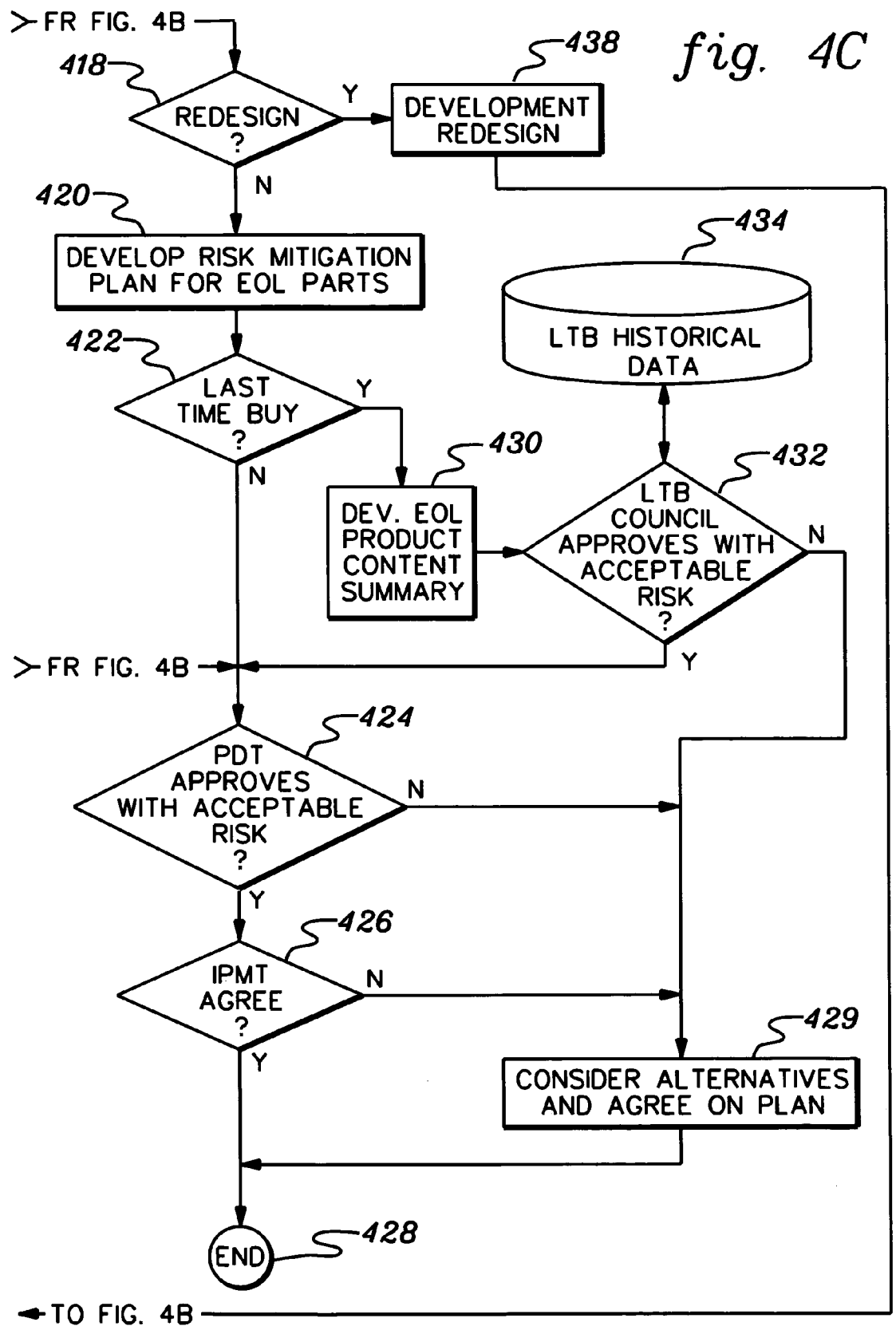

Further details regarding one embodiment of the logic to manage parts usable in one or more products are described with reference to FIGS. 4a-4c. This logic has multiple entry points reflecting the fact that the process can be performed at various stages of a product's life cycle. The particular point at which the logic is entered is dependent, at least in part, on the stage of the product's life cycle and/or on other considerations, such as newly obtained information.

For instance, the logic is entered at entry point 400 when there is new information to be entered into the database and considered. This logic may be performed each time new information is added, when there is a predefined amount of new information, at defined intervals (e.g., every three months), etc.

As a further example, the logic is entered at entry point 402, when a bill of material is created for one or more parts selected for a product. Yet further, the logic is entered at entry point 404 at various decision checkpoints of a product's life cycle, such as the concept decision checkpoint, plan decision checkpoint or launch decision checkpoint.

Referring initially to entry point 400 (FIG. 4a), one or more end of life notices for one or more parts are received from one or more suppliers, STEP 405. These notices include supplier provided end of life data for the one or more parts. If the notices are received from an external supplier, then procurement, in this example, inputs the end of life data (e.g., the provided dates) into a database 407 (e.g., eXplore), STEP 406. Similarly, if the notices are received from an internal supplier, then internal personnel, other than procurement, in this example, inputs the end of life data into database 407, STEP 408. (In another embodiment, the same person or department may input the externally and internally supplied data. Also, in a further embodiment, personnel other than those mentioned above may be responsible for this task.)

Additionally, in accordance with an aspect of the present invention, estimated end of life data for one or more parts are also input to database 407. For example, end of life data (e.g., end of life date(s)) is estimated for one or more procured parts (e.g., from external suppliers), STEP 409, and input to database 407. Likewise, end of life data is estimated for one or more internally supplied parts, STEP 410, and input to database 407.

Although the above procedure describes the input of actual and estimated data for procured and internal parts, at any given time, only one or more of the inputs may be provided.

In one embodiment, periodically, the end of life data is audited for timeliness and accuracy, STEP 412. For example, auditors examine the information in the database to determine the last update to the information and request updates if the information has not been provided in a timely manner. The results of the audit are provided back to procurement and to the internal department, so that they may take any necessary actions.

The populated database is then used in further processing. In one embodiment, the processing is performed for each selected product to be reviewed. For example, a product is selected and a review of the parts of that product is undertaken to determine whether the product has any parts at risk of reaching their end of life prior to the end of life of the product. The product may be selected randomly, per a defined review schedule or based on new information entered into the database, as examples. Further, the product may be a product in any stage of a product's life cycle. As examples, it may be an existing product or a product in design.

For the selected product, processing continues with a determination as to whether there are any end of life parts for that product, INQUIRY 414 (FIG. 4B). As used herein, end of life parts include those parts that have reached their end of life, those with an actual supplier supplied (either external or internal) end of life date that predates the end of life date of the product under review, and/or those with an estimated (non-supplier supplied) end of life date that predates the product's end of life date.

In one example, to determine whether there are any end of life parts for the product, a comparison is made between the end of life data of each part of the product for which there is end of life information (or a subset thereof) and the end of life data of the product. For instance, the end of life date (actual or estimated) of a part is compared to the end of life date of the product. If the end of life date for the part predates the end of life date of the product, then the part is flagged as an end of life part.

If there are no end of life parts for the given product under consideration, then processing continues with INQUIRY 424 (FIG. 4*c*), in which a determination is made as to whether the product development team approves of the plan as it stands. For instance, is the team satisfied with the selected parts based on the given considerations and/or is the team satisfied that the parts are not at a high risk of becoming end of life parts.

If the product development team approves, then a further inquiry is made as to whether an integrated portfolio management team agrees, INQUIRY 426. If so, processing is complete, STEP 428.

On the other hand, should the product development team disapprove or if the integrated portfolio management team disagrees, then alternatives are considered and an acceptable plan is developed, STEP 429. These alternatives may include, for instance, approaching the supplier and discussing other options, as well as other or different alternatives.

Returning to INQUIRY 414, should there be one or more end of life parts for the given product under consideration, a determination is made as to whether there are any alternate parts available, INQUIRY 416. That is, are there any parts that can readily or with little effort replace the end of life parts. If there are no alternate parts available, then a further determination is made as to whether a redesign of the product should take place, INQUIRY 418 (FIG. 4*c*). To make this decision, various factors are considered including, but not limited to, cost, complexity of the part and/or a product, scheduling, resources, etc. This is a business decision that depends on the product, the part, as well as the various factors.

Should there be no alternate parts available and a decision is made not to redesign, then a risk mitigation plan is developed for the end of life parts, STEP 420. This includes, for instance, performing a business case analysis to determine if a last time buy order is to be placed at a future date; consideration of alternate sources; consideration of options with the current supplier; etc.

Thereafter, a determination is made as to whether the risk mitigation plan includes a last time buy, INQUIRY 422. If not, then processing continues with INQUIRY 424 in which a determination is made as to whether the product development team approves of the risk mitigation plan. If the team approves, then another inquiry is made as to whether the integrated portfolio management agrees, INQUIRY 426. If both agree, then processing is complete, STEP 428. Otherwise, other alternatives are considered and an acceptable plan is developed, STEP 429.

Returning to INQUIRY 422, if the decision is made to place a last time buy, then an end of life product content summary is developed, STEP 430. This summary includes, for instance, the end of life part; an indication of its end of life date; the product's end of life date; the decision for a last time buy; a summary of the number of action plans to be completed and an indication of those to be completed; etc.

Thereafter, a determination is made as to whether a last time buy council approves with the acceptable risk, INQUIRY 432. For instance, is the council satisfied that the cost of the last time buy is justified. If so, then processing continues with INQUIRY 424. However, if the council does not approve, INQUIRY 432, then processing continues with STEP 429. In addition to the above, the council stores information regarding the last buy in a database 434 for historical purposes. Information in this database may be used in the council's analysis.

Returning to INQUIRY 418, if a redesign is indicated, then a redesign development plan is constructed, STEP 438, and processing continues with STEP 436 of FIG. 4B. At STEP 436, parts are selected that satisfy the redesign and a bill of materials is created for the parts. The bill of materials includes a detailed list of the parts used by a particular product and includes information, such as part number, cost information and/or other information. Subsequent to selecting the parts and creating the bill of materials, processing continues once again with a determination as to whether there are any end of life parts, INQUIRY 414.

Similarly, if the result of the inquiry at 416 is that there are available parts, then processing continues with selecting the parts, creating the bill of materials, and determining whether any of the newly selected parts are end of life parts, STEP 436 and INQUIRY 414.

In addition to initiating processing at entry point 400, processing may also be initiated at entry point 402. This is the case, for instance, when a new product is being developed. At this point, the parts are being selected for the product under development. After selection of the parts, processing continues with an inquiry as to whether any of the selected parts are end of life parts, INQUIRY 414. The processing that follows will take into consideration the fact that it is a new product being developed.

Another entry point is at point 404. This is the entry point for each decision checkpoint. At this entry point, processing includes inputting by the development team a projected end of life date for the product under development, STEP 440. The product end of life date, as well as the projected end of life date for the parts to be used in the product, are analyzed to determine if there are any end of life parts, STEP 442. If there are any end of life parts, INQUIRY 444, then processing continues with INQUIRY 416. Otherwise, processing continues with INQUIRY 424 (FIG. 4C).

In the above described logic, approval is sought from various teams and/or councils; however, this is only one example. One or more of those approvals are optional. Further, the approvals may be sought from other teams, councils, and/or other decision makers. Those provided herein are just examples.

One example of the management process being used in the development of a server is described with reference to FIG. 5. In this example, a spreadsheet is depicted having the following five columns: a part type 500, which includes an indication of the product being developed (e.g., a server), as well as various parts for that product; a manufacturing designation 502, which indicates whether a part is an internally supplied part (white), an off-the-shelf part (black), or somewhere in between (gray); a part number indication 504, which includes the part number of the part to be used in the product; a product/part withdrawal indication date 506, which indicates the date a particular product or part is projected to be withdrawn from the market, as far as the user is concerned; and an actual/estimated end of life date 508, which indicates the actual end of life date for a part, as supplied by the supplier or as estimated.

In this particular example, a server 510 is being developed, and therefore, one or more program managers and/or product development personnel generate a list of parts to be used in developing the product. This list of parts includes, for instance, a 1 GHz processor 512, a 1.2 GHz processor 514, another processor 516, a 2 GB memory card 518 and an Ethernet card 520. Additionally, it is determined by the bill of materials that one or more of the parts include separately visible parts themselves including, for instance, a capacitor 522 (a part of the memory card), an ASIC module 524 (used on the processor card), a high speed connector 526, and a regulator 528.

The server has a projected withdrawal date of fourth quarter 2007. That is, the user plans on offering the server until that date. Thus, the parts are needed for at least that duration. Some parts are indicated as being desired longer, as depicted in column 506, which may include feature upgrades sold after the product is withdrawn. The projected withdrawal dates are, for instance, educated estimates based on experience.

The information in the spreadsheet is used to determine whether a part is at risk of reaching its end of life prior to the expected end of life of the server being developed. For instance, processors 512 and 514 each have an actual/estimated end of life date of fourth quarter 2010, which is well past the expected life of the server. Thus, these are not considered at risk parts. Similarly, processor 516 and memory card 518 also have end of life dates that are subsequent to the end of life date of the server. Thus, these parts are not considered end of life parts.

As a further example, Ethernet card 520 has an actual/estimated date of second quarter 2004. This is indicated as a problem. However, the company supplying that card has indicated that it will introduce a suitable replacement, and thus, this part is flagged as cautionary.

As yet another example, capacitor 522 has an actual/estimated date of third quarter 2005. Since there is no known replacement at this time because this part has some unique characteristics, it may be necessary to plan a last time buy or take some other course of action, such as trying to find an alternate part. This part is flagged as red.

Another example is module 524 which has an actual/estimated end of life date of third quarter 2005. In this example, this module is an internal design that is being phased out. The business case analysis indicated that the redesign development expense is $2,000,000 and the last time buy expense is $300,000. Since this part reaches its end of life towards the latter end of the server's life, the plan is to place a last time buy order.

In addition to the above examples, many other examples also exist.

Figure 6:
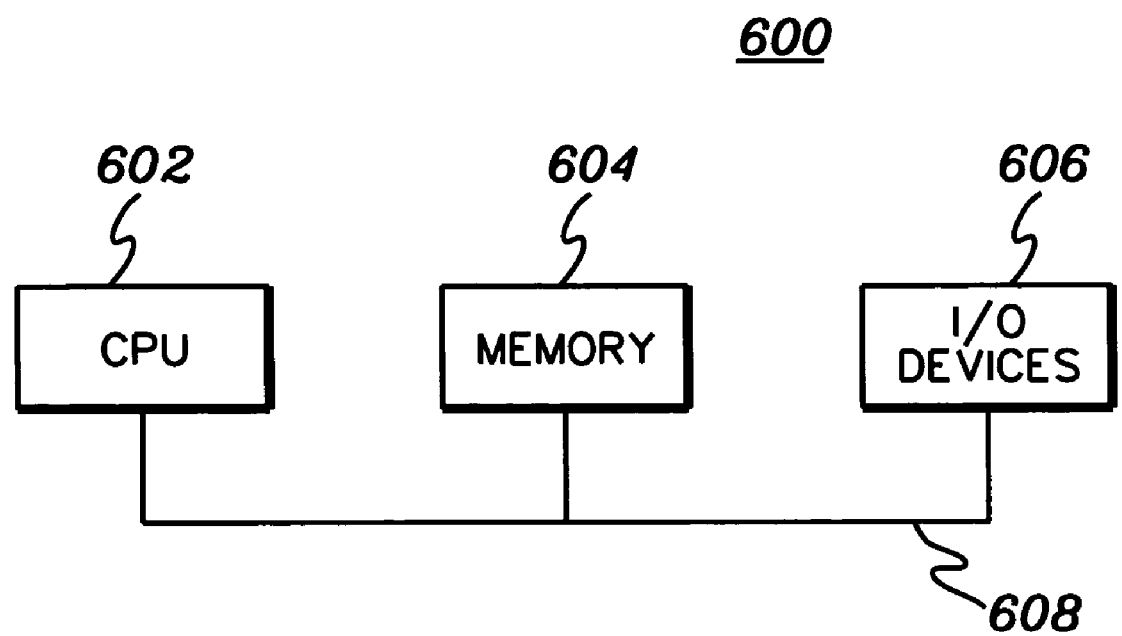
FIG. 6 depicts one embodiment of a communications environment to facilitate one or more aspects of the present invention.

Described in detail above are various processes, databases and/or tools that may be used to obtain, manage and/or analyze information in accordance with one or more aspects of the present invention. Although examples of processes, databases and/or tools are provided, these are only examples. Many types of processes, databases and/or tools may be used without departing from the spirit of the present invention. One or more of the processes and/or the logic described herein may be executed within various communications environments, including various computing environments. One example of a communications environment useful in the management facility of the present invention is described with reference to FIG. 6.

In one example, a communications environment 600 includes, for instance, a central processing unit 602, a memory 604 (e.g., main memory) and one or more input/output (I/O) devices 606 coupled to one another via, for example, one or more buses 608. The communications environment may include a server, a personal computer, a mainframe computer, as well as many other types of computing units and/or communications devices.

Described in detail above is a capability for managing use of parts in products. Parts reaching their end of life prior to products for which the parts are usable results in last time buys, redesigning products and/or considering other alternatives, many of which significantly impact a company's expenses. Thus, a common management system, common process, common tools and/or common metrics are used to reduce the risks of using end of life parts. A tool is created that encapsulates the data, analyses, logic and processes and is usable by various users that wish to reduce the risk of utilizing end of life parts. The tool includes interfaces that allow the input of data; code to perform the various inquiries and steps of the logic; and interfaces that provide an output of the results. One or more reports may also be generated by the tool.

The processes, tools and/or organizational structure of one or more aspects of the present invention are continuously modified and enhanced to ensure that the most up-to-date information and sources are used.

Advantageously, one or more aspects of the present invention minimize use of end of life parts, minimize last time buys, minimize redesigns, reduce overall business costs, reduce inventory, and improve return on investment.

Minimizing use of end of life parts is particularly useful when parts are used across products and across product lines. It is beneficial to use common parts across a wide array of products, as described in a co-pending patent application entitled, "Facilitating Management of Parts of Products to Optimize Use of Common Parts," IBM Docket No. POU920030217US1, Desai et al., assigned to International Business Machines Corporation, Armonk, N.Y., and hereby incorporated herein by reference in its entirety. However, the use of common parts exacerbates the problem being addressed herein. For example, the use of common parts for longer periods of time in multiple generations of products increases the number of last time buys. The cost benefits and other benefits associated with common parts and parts reuse can be substantial, but are to be balanced with the increasing expense of last time buys. This is addressed by one or more aspects of the present invention.

For example, one or more aspects of the present invention provide an easy-to-use system that aids designers, as well as others, in the avoidance of parts at risk of becoming end of life. The techniques may be integrated with design tools to provide each designer, at the time the designer is making its parts selection, with the best possible assessment of when a part is likely to reach its end of life.

Described herein is a closed loop process across development teams, procurement, manufacturing, development councils, various teams and brand organizations, that provides clear visibility to at risk parts. A systematic process is provided for managing end of life parts.

Although examples and embodiments are described herein, there may be many variations to these examples and embodiments without departing from the spirit of the present invention. For instance, although various teams and councils are described, other teams and/or councils may utilize and/or benefit from one or more aspects of the present invention. Further, one or more of the steps associated with reaching agreement may be omitted.

One or more aspects of the present invention are applicable to any type of products that have parts. The server example described herein is only one example. Further, the communications environment is only one example. The processes and tools described herein may be executed on devices other than computing units. Many other variations exist.

In one embodiment, a part is considered end of life when it is withdrawn from manufacturing. In another embodiment, it is considered end of life when it is withdrawn from service. However, in other embodiments, a part may be considered end of life at other times during its life cycle, without departing from the spirit of the present invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing use of parts in products, said method comprising:
   independent of a supplier of a part usable in at least one product, obtaining an estimated end of life date for the part, said estimated end of life date being generated by an entity other than the supplier of the part and representing an estimate of when the part will no longer be available, the estimated end of life date for the part being obtained prior to issuance by the supplier of the part of an end of life date for the part; and
   using the estimated end of life date to manage use of the part in a product.

2. The method of claim 1, wherein the obtaining comprises retrieving the estimated end of life date from a database, said database comprising one or more parts for one or more products, at least one part of the one or more parts having the estimated end of life date associated therewith.

3. The method of claim 2, further comprising populating the database with the estimated end of life date.

4. The method of claim 1, wherein the using comprises:
   comparing the estimated end of life data of the part with end of life date of the product; and
   managing use of the part in the product based on the comparing.

5. The method of claim 4, wherein the using further comprises performing analysis, in response to results from the comparing, to facilitate managing use of the part in the product.

6. The method of claim 5, wherein the analysis includes at least one of a cost analysis, an analysis of whether an alternate part is available, an analysis as to whether the product is to be redesigned, and an analysis as to whether a last time buy order is acceptable.

7. The method of claim 4, wherein the managing comprises choosing not to use the part in the product.

8. The method of claim 4, wherein the managing comprises choosing to use the part in the product and planning on placing a last time buy order for the part at some point in time.

9. The method of claim 1, further comprising creating one or more reports associated with the estimated end of life date.

10. The method of claim 1, further comprising repeating the obtaining and the using one or more times.

11. The method of claim 10, wherein the repeating is performed during one or more defined checkpoints within a life cycle of the product.

12. Computer-readable medium for storing data for access by code being executed in a communications environment, said computer-readable medium comprising:
   a database used by said code to facilitate management of use of a part in a product, said database comprising an estimated end of life date for the part, said estimated end of life date being independently generated by an entity other than a supplier of the part and representing an estimate of when the part will no longer be available, the estimated end of life date for the part being obtained prior to issuance by the supplier of the part of an end of life date for the part, and being used by said code to manage use of the part in the product.

13. A system of managing use of parts in products, said system comprising:
   means for obtaining, independent of a supplier of a part usable in at least one product, an estimated end of life date for the part, said estimated end of life date being generated by an entity other than the supplier of the part and representing an estimate of when the part will no longer be available, the estimated end of life date for the part being obtained prior to issuance by the supplier of the part of an end of life date for the part; and
   means for using the estimated end of life date to manage use of the part in a product.

14. The system of claim 13, wherein the means for obtaining comprises the means for retrieving the estimated end of life date from a database, said database comprising one or more parts for one or more products, at least one part of the one or more parts having the estimated end of life date associated therewith.

15. The system of claim 13, wherein the means for using comprises:
   means for comparing the estimated end of life date of the part with end of life data of the product; and
   means for managing use of the part in the product based on the comparing.

16. The system of claim 15, wherein the means for using further comprises means for performing analysis, in response to results from the comparing, to facilitate managing use of the part in the product.

17. An article of manufacture comprising:
at least one computer usable medium having computer readable program code logic to manage use of parts in products, the computer readable program code logic comprising:
obtain logic to obtain, independent of a supplier of a part usable in at least one product, an estimated end of life date for the part, said estimated end of life date being generated by an entity other than a supplier of the part and representing an estimate of when the part will no longer be available, the estimated end of life date for the part being obtained prior to issuance by the supplier of the part of an end of life date for the part; and
use logic to use the estimated end of life date to manage use of the part in a product.

18. The article of manufacture of claim 17, wherein the use logic comprises:
compare logic to compare the estimated end of life date of the part with end of life data of the product; and
manage logic to manage use of the part in the product based on the comparing.

19. The article of manufacture of claim 18, wherein the use logic further comprises perform logic to perform analysis, in response to results from the comparing, to facilitate managing use of the part in the product.

* * * * *